United States Patent [19]

Cole

[11] 4,416,903

[45] * Nov. 22, 1983

[54] ANTISTALING BAKING COMPOSITION

[76] Inventor: Morton S. Cole, 2506 Ivy La., Decatur, Ill. 62521

[ * ] Notice: The portion of the term of this patent subsequent to Mar. 16, 1999 has been disclaimed.

[21] Appl. No.: 355,908

[22] Filed: Mar. 8, 1982

Related U.S. Application Data

[63] Continuation-in-part of Ser. No. 862,653, Dec. 20, 1977, Pat. No. 4,320,151, which is a continuation-in-part of Ser. No. 693,356, Jun. 7, 1976, abandoned.

[51] Int. Cl.³ .............................................. A21D 2/08
[52] U.S. Cl. ........................................ 426/18; 426/20; 426/62; 426/64; 426/549; 426/551; 435/188
[58] Field of Search ...................... 426/18, 20, 62, 64, 426/549, 551; 435/188

[56] References Cited

U.S. PATENT DOCUMENTS 4,320,151  3/1982  Cole ................................. 426/64 X

OTHER PUBLICATIONS

Adams, "Amylases: Their Kinds and Properties and Factors Which Influence Their Activity", Food Technology, Jan. 1953, pp. 35–38.

*Primary Examiner*—Joseph M. Golian
*Attorney, Agent, or Firm*—Laff, Whitesel, Conte & Saret

[57] ABSTRACT

The invention relates to products and processes for employing heat stable enzymes especially—although not exclusively—for retarding the staling of baked and leavened cereal products. A concentrated protective sugar medium is used to solubilize or disperse a fungal alpha amylase enzyme before it is incorporated in a dough. This medium protects the enzyme against thermal denaturation, thereby enabling the enzyme to remain active during baking and until the starch of the dough becomes gelatinized and subject to enzyme attack. A preferred embodiment of the dough also includes chemical emulsifiers which may be used in conjunction with the fungal alpha amylase enzyme dispersed in the concentrated sugar solution. The invention addresses the conflicting requirements that enzyme activity must continue as long as possible throughout the baking process to retard staling; however, all activity must terminate before the end of the baking process to prevent the dough from becoming a sticky mass or paste.

5 Claims, 1 Drawing Figure

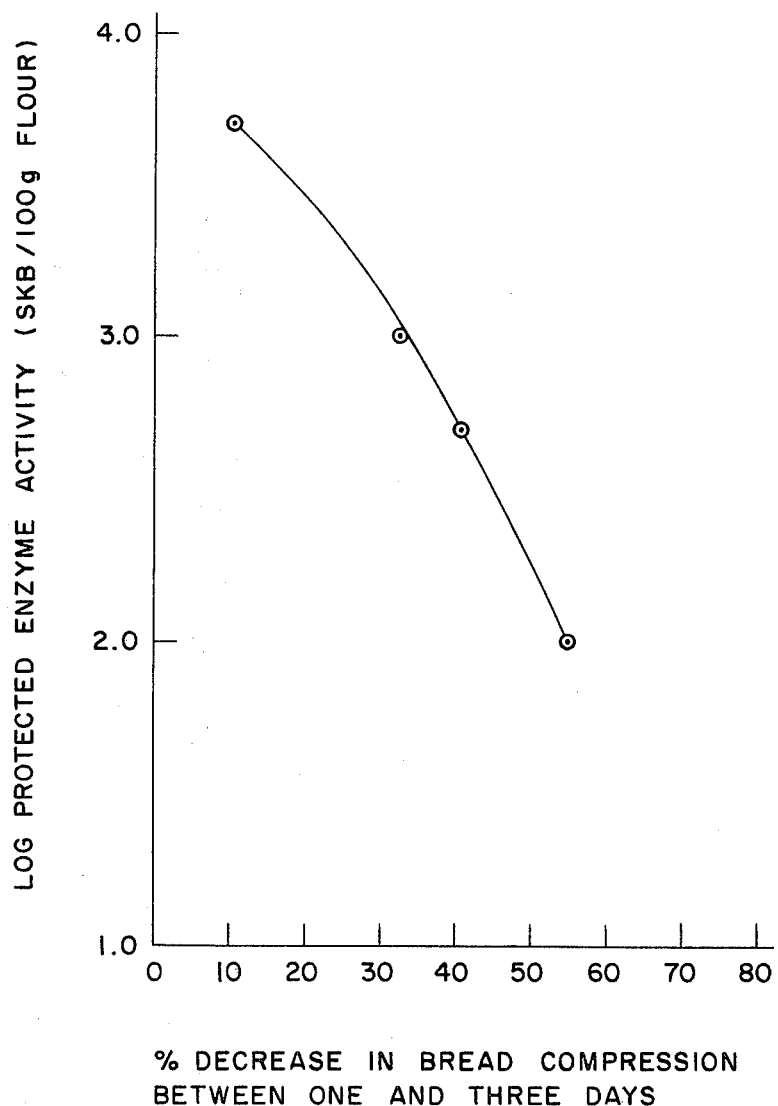

ANTISTALING BAKING COMPOSITION

This is a continuation-in-part application of pending prior application Ser. No. 862,653, filed on Dec. 20, 1977 (now U.S. Pat. No. 4,320,151, granted Mar. 16, 1982) by Morton S. Cole for Antistaling Baking Composition and that application was a continuation-in-part of a then pending application Ser. No. 693,356, filed June 7, 1976 (now abandoned).

This invention relates to heat stabilized enzymes and to products, processes and composition which may be incorporated in a dough to improve softness and prevent staling of leavened cereal products over longer periods of time than has heretofore been possible.

The term "protected enzyme" means a use of a dispersion of the enzyme in a medium, which dispersion extends the range of enzyme activity beyond the terminal temperature at which the normal activity virtually ceases for the unprotected enzyme.

As used herein, the term "bread" is intended to apply generically to bakery products.

Bread made from dough is one of the basic foods of the world. In recent years, attention has been drawn to bread as a vehicle for providing a great amount of critical nutrients, such as proteins, especially in diets of nutritionally deficient peoples. The production and distribution of nutritionally enriched bread would be enhanced by the availability of an improved method for retarding staling, for it is unlikely that the highly mechanized and centralized distribution networks that have been established in this country would be suitable for developing nations.

Yeast raised bread, for example, is prepared from a dough including wheat flour, water, yeast, and small amounts of sugar, shortening and salt. Under the influence of mixing, a viscoelastic dough is formed as the protein of wheat flour, gluten, becomes hydrated and forms elastic films. This film entraps the gas evolved by the yeast during fermentation and causes the bread to rise as the gas expands.

Chemically leavened bakery products such as biscuits, muffins and quick breads differ substantially from yeast raised products in composition and method of preparation. Chemically leavened bakery products are prepared from lower protein flours. The doughs or batters are subjected to less intense mixing and gluten development is less important among these products. Intense mixing and gluten development may even be undesirable in certain chemically leavened products, such as biscuits, where too much gluten development results in toughness. Accordingly, the starch component of flour is a relatively more important structural component in chemically leavened products than in yeast leavened products. Like yeast leavened products, chemically leavened products are also subject to firming or staling and can therefore benefit from the application of this invention.

Chemical emulsifiers or surfactants commonly used in break baking include: mono- and diglycerides of fat forming fatty acids, esters of mono- and diglycerides such as diacetyl tartaric acid esters-, propylene glycol esters-, and succinic acid esters of mono- and diglycerides; ethoxylated mono- and diglycerides, polysorbate 60 (polyoxyethylene sorbitan monostearate), lactylic esters of fatty acids, sodium stearoyl-2-lactylate and calcium stearoyl-2-lactylate. These emulsifiers or surfactants are presumed to be related to the observed reaction between surfactants and soluble amylase in aqueous dispersions, where formation of complexes between the starch molecules and surfactants can be demonstrated. It is thought that the complexing of linear starch molecules by chemical surfactants prevents retrogradation or association between the linear starch molecules. When comparable reactions occur in a dough, the retarding of bread firming results. It is not actually clear whether such reactions do occur in dough.

Bread staling is an incompletely understood phenomenon which is reviewed in "*A Review of Bread Staling*" by Henry F. Zobel, in "The Baker's Digest" for October 1973, page 52. Briefly, the staling of bread refers to an increase in firmness with a passage of time. Staling is of considerable economic importance since it limits shelf life to about three or four days in the store, plus several additional days at home. Because of this short shelf life, wholesale bakeries must have separate distribution systems which operate independently of the usual channels for packaged food distribution. Further, the market area of a bakery is generally limited by the maximum radius that the distribution system can cover within 24 hours. This limitation does not always permit the most efficient plant size.

The staling of bread is usually related to the retrogradation of starch, or the association of starch molecules to form areas of crystalinity which result in a firming of the bread. Cereal chemists and bakery technologists have found that various chemical emulsifiers have some effect in extending the shelf life of bread. However, chemical emulsifiers are only partially effective in reducing bread staling since they do not reduce the rate of staling but merely increase the initial bread softness.

These technologists have also found that certain enzymes may be used to retard staling. More particularly, a pertinent article entitled "*A Comparison of Cereal, Fungal, and Bacterial Alpha-Amylases as Supplements for Breadmaking*", written by Miller, Johnson, and Palmer appears in the journal "Food Technology," January 1953, page 38. This article compares cereal, fungal and bacterial amylase enzymes which have been used in breadmaking in order to control the staling process. Further, this article makes a point that two little enzyme action does little or nothing to prevent staling. Too much such enzyme action causes stickiness. If the enzyme is inactivated at too low a baking temperature, there is almost no effect and early staling follows. If the enzyme action survives baking and continues while the bread is on the shelf, there is an early stickiness and a gummy crumb. Miller, Johnson and Palmer conclude that bacterial amylase is the enzyme which is most protected against thermal inactivation and that fungal amylase is the enzyme which is the most thermolabile or least protected.

Another approach to the retarding of bread staling has involved the use of a heat-stable bacterial alpha amylase enzyme, as disclosed in U.S. Pat. No. 2,615,810, to attack gelatinized starch granules during baking. Bacterial alpha amylase enzyme seems well suited to applications in baking since this enzyme retains its activity at temperature well above those required to gelatinize starch. By hydrolyzing long starch chains, bacterial alpha amylase prevented starch retrogradation and, consequently, significantly retarded bread firming. However, its high thermal stability allowed bacterial alpha amylase to survive the baking process and continue to hydrolyze starch during the shelf life of the product. The dextrins that were produced, as a result, causes excessive gumminess in baked products. Consequently, bacterial alpha amylase has not found commercial acceptance as a bread softening agent. Other articles on bacterial alpha amylase enzymes are "*Heat-Stable Bacterial Alpha-Amylase in Baking*" from the Bakers Digest, August 1964, page 66.

Frequently, fungal alpha amylase enzyme is used by bakers for a number of reasons, especially since they produce fermentable sugars from starch that is susceptible to enzyme attack, when in a dough. This starch is primarily damaged starch in unheated doughs. Intact, starch granules are not susceptible to enzyme attack until they have been gelatinized. Damaged starch itself is detrimental to dough-mixing properties since damaged starch absorbs a greater quantity of water than normal starch absorbs. Therefore, an inclusion of damaged starch requires the input of greater mixing energy to achieve a comparable level of dough development. Finally, dextrins are produced by fungal alpha amylase and they improve gas retention in dough.

Only a small quantity of damaged starch is present in flour. The reducing sugars produced from this starch, through the action of fungal alpha amylase, is not of much significance to the development of leavening gas in doughs having fermentable carbohydrates (such as sucrose or dextrose) as normal formula components, as in yeast-leavened bakery products.

Therefore, fungal alpha amylase enzyme has found its greatest use—not to provide sugars for yeast fermentation—but to hydrolyze the highly absorptive damaged starch. Thus, normally, this enzyme is used so that flour will mix properly and exhibit normal dough development properties.

Miller, Johnson and Palmer, cited above, studied the applicability of alpha amylases for giving significant antifirming properties to bread, by breaking down a sufficient number of starch molecules to prevent the crystallization or intermolecular association of starch molecules from setting into a rigid structure, or "staling." Miller et al agreed that this effect of alpha amylases was related to their thermostability. Bacterial alpha amylase is the most thermostable and fungal alpha amylase is the least thermostable, among the alpha amylases tested. Thus, effective antifirming action of alpha amylases requires that a sufficient—though not excessive—quantity of starch chains be degraded to prevent their subsequent association or retrogradation, which is the direct cause of staling. The hydrolysis of starch by alpha amylase enzymes can only occur following gelatinization of the starch, after which the starch molecules are susceptible to enzyme attack. It follows that, to be useful for antistaling, an alpha amylase must survive in a baking dough until the starch is sufficiently gelatinized to permit the necessary hydrolysis to occur.

The thermostability of fungal alpha amylase is such that the enzyme is largely inactivated by the time that the starch in the baking product may be attacked and hydrolyzed by this enzyme. Thus, there is a need for preserving the activity of fungal alpha amylase in a dough until after the starch gelatinization has occurred. In a baking product, this preservation enables a greater degree of starch hydrolysis to occur without incurring the excessive hydrolysis that is provided by the extremely heat tolerant bacterial alpha amylase. This protection of an otherwise heat sensitive enzyme, in a dough, is an objective of this invention.

The major component of wheat flour is starch. Upon mixing with water to form a dough, the extensible gluten proteins of wheat form a film-like matrix, in which the starch granules are embedded. During baking, the starch granules absorb water and swell. The availability of water in a dough is limited, however, and a sufficient amount of water is not available to completely swell and burst all of the starch granules. Thus, the physical state of starch in bread is characterized by partially swollen starch granules. Some gelatinized starch is released from the starch granules to occupy the spaces between starch granules. These extended starch molecules are released from starch granules to form intermolecular associations that cause the bread structure to become firm after several days.

Wheat flour dough is a dynamic material that exhibits consistency, plasticity, mobility and elasticity. These characteristics derive from the properties of hydrated proteins, starch, pentosans and additional minor components of flour, together with the added dough-forming ingredients such as salts, yeast, fats and sugars. About half of the water added in the formation of a dough is strongly bound by the flour constituents. The remainder of the dough-forming water is free, although it contains concentrated solutions and colloidal dispersions of the flour solubles.

The baking dough represents a dynamic system with respect to the nature of the major molecular components of the dough and to their water sorption characteristics. In greater detail, when dough is baked, its temperature gradually rises until the gluten becomes denatured and the starch gelatinizes. On denaturation, protein loses much of its water-holding capacity while the water-holding capacity of starch increases many fold on gelatinization. Therefore, during baking, moisture is transferred between gluten and starch.

The ability of solutions of concentrated sugars or polyhydric alcohols to protect enzyme activity has been demonstrated previously. In an article entitled *Stabilization of Enzymes in Polyhydric Alcohols*, Yasumatsu et al show that glucose, sucrose and polyhydric alcohols such as glycerol and sorbitol provide some thermal stabilizing effect for a proteolytic enzyme. This article by Yasumatsu, Ohno, Matsumuke and Sumazono is found in the journal, Agricultural and Biological Chemistry (a Japanese publication), Vol. 29, No. 7 665–671, 1954 (It is thought that the date 1954 is in error since the Yasumatsu et al article states that it was received 1965). The article states that in 1929 Beilinson reported that protein dissolved in a saturated solution of sugar was stable against heat. However, I know of no evidence that Beilinson either considered enzymes or an encapsulation of an enzyme in a sugar medium to protect it either during the mechanical working of dough in a mixer or from the heat of baking.

Another significant article by Adams entitled "*Amylases: Their Kinds and Properties and Factors Which Influence Their Activity*" appeared in "Food Technology," January 1953, p. 35. Adams shows the effect of a series of sucrose solutions, ranging in concentration from 0 to 40%, on the activity of a fungal alpha amylase preparation acting upon a soluble starch substrate at pH's of 5 and 6 and at temperatures to 63° C. Adams also shows greater activity of the enzyme at pH 5.0 in solutions of 20 to 40% sucrose compared to the activity of the enzyme in 0% sucrose.

The conditions under which Adams demonstrates increased activity of fungal alpha amylase in a sucrose solution differ from the conditions set forth in this disclosure in several respects. Adams uses a soluble starch substrate whereas I have used a starch gel in static experiments. Adams only tested at a maximum temperature which was well below the temperature at which fungal alpha amylase is inactivated. I have demonstrated protection of the enzyme at temperatures up to 82.2° C. at which the enzyme is rapidly inactivated if unprotected. I was unable to demonstrate a protective effect of the enzyme below 40% sucrose, while Adams shows enhanced activity at 20% sucrose concentration.

Thus, some level of protection of various proteins and enzymes against heat or other inactivation mechanism has been demonstrated in static systems for various media. However, the ability of a concentrated sugar medium to provide sustained protection during dough mixing, handling, fermentation, and a subsequent baking period is a surprising result in view of the operating forces and changes which occur in a baking dough and can affect the concentration of the sugar solution protecting the fungal alpha amylase enzyme. The factors bringing about these operating forces and changes include the level of free water in the dough, the migration of water from gluten to starch during baking, the change in ratio of free to bound water, the change in concentration of soluble solids in the free water component and its effect on concentration gradients and diffusion of water through the baking dough.

A number of working examples are presented hereinafter wherein fungal alpha amylase was used at a constant level in both protected (sugar dispersed) and unprotected forms. Greater antifirming effects in bread were observed for the treatment of sugar dispersed fungal alpha amylase enzyme together with an emulsifier, as compared to the antifirming effects observed for this same treatment and with the same level of unprotected fungal alpha amylase enzyme. This comparison and these observations confirm that the sugar-protecting medium survived incorporation and handling in a dough and that the protected enzyme survived to a higher temperature during the baking of dough. This verifies the thermostabilizing effect of a concentrated sugar medium on the enzyme in a dough. At the same time, the improvement in bread softness rentention, evidenced by the combination of sugar-protected enzyme and emulsifier, also demonstrates that the enzyme is available for the hydrolysis of starch in the dough matrix after the starch becomes susceptible to enzyme attack following gelatinization.

Accordingly, an object of this invention is to provide both a process and a composition for breakmaking which will significantly retard the staling of bread. Another object of this invention is to retard staling of leavened cereal products.

A further object of this invention is to reduce the economic losses to bakers and consumers stemming from both return and discard of stale bakery products.

Yet another object of this invention is to make acceptable bakery products available to areas and institutions where rapid distribution methods developed by the commercial baking industry are not available, such as military facilities, construction camps, and other small communities which are far removed from sources of fresh bakery goods. Still another object of this invention is to provide a means for extending the shelf life of protein and other nutritionally enriched leavened cereal products especially in underdeveloped areas.

Still another object of the invention is to provide new and improved methods of and means for stabilizing enzymes against temperature denaturation. Here, an object is to provide means for enabling fungal enzymes to withstand higher temperatures. In this connection, an object is to also provide enzymes which will be deactivated at a still higher given temperature. Hence, an object is to provide enzymes which are active in a selected temperaure zone.

Yet another object of this invention is to provide new and improved processes for protecting enzymes during heat treatment.

The single sheet of drawing is a graph which shows how the protected enzyme activity affects bread compression during a time span extending up to three days.

In keeping with an aspect of the invention, these and other objects have been accomplished by my discovery that the thermal stability of fungal alpha amylase is substantially increased by dispersing aqueous solutions of the enzyme in concentrated sugar solutions. The syrup-protected fungal alpha amylase enzyme survives incorporation in a dough and remains active until a temperature is achieved at which starch gelatinization occurs. Partial hydrolysis of starch takes place and the softness of bread is increased. Maximum effectiveness of the protected fungal alpha amylase enzyme is obtained when it is used concurrently with chemical emulsifiers of the appropriate types. There is a synergistic effect between the protected fungal alpha amylase enzyme and chemical emulsifiers which causes a reduction in the rate of bread staling. While this reduction in staling primarily relates to yeast-raised bread, it will be apparent that similar results are obtainable in fresh, refrigerated and frozen yeast-raised buns and rolls, yeast-raised sweet doughs, and chemically leavened baked products prepared from doughs, such as muffins, quick breads and biscuits, for example.

For enzymatic hydrolysis of starch to occur, as in any enzymatic reaction, an enzyme substrate complex must form. I visualize that, although the enzyme is dispersed in sugar syrup, the enzyme becomes available for complexing with gelatinized starch molecules, possibly by the slow diffusion of water into the syrup to reduce its concentration and allow contact between starch and enzyme.

In my evaluations of the effects of the various procedures described herein, I cut three cubes (two inches on each side) from the interior of each loaf of bread. A standard weight of 300 grams was uniformly distributed across the top of each cube, and the weighted cube was allowed to compress solely under the influence of the weight. I measured the height of each cube before any compression, and after compression for two minutes under the 300 gram weight. This measurement was made twenty-four hours, and seventy-two hours after baking. The height reduction was thus a function of the firmness or staling of the bread. The percentage of decrease in compressibility following baking was determined from the initial softness and the retention of softness after seventy-two hours.

Fungal alpha amylase activity was determined by the liquefaction of a starch gel. Initially, a starch gel appears to have the consistency of well-known edible gelatin desserts. As the gel becomes liquid under the influence of alpha amylase action, it takes on the appearance and the viscosity of water. When the liquid swishes about, as water in a bowl, with no observable lumps, it is judged to have become a liquid.

In the description which follows, it will be convenient to refer to the dispersal or mixing of the enzyme throughout a dough. As will become more apparent, the enzyme is being held in a sugar solution at the time of such dispersal or mixing. Conceptually, it is thought that the dispersal will not result in a spread of particles, but will result in a series of layers or ribbons which fold and spread through the dough in a random and unstructured manner, somewhat reminiscent of taffy ribbons. For convenience of expression, this form of dispersal is herein called a "film."

As noted above, bacterial alpha amylase enzymes have not found acceptance in commercial breadmaking practice because the enzyme activity continued through the baking period and thereafter during shelf like. Excessive dextrinization of starch caused undesirable gumminess in treated baked products. To obtain a desirable level of starch hydrolysis in a baked product and to reduce the level of starch retrogradation and associated staling, an alpha amylase enzyme should have sufficient heat stability to survive the baking process until a substantial amount of starch becomes gelatinized and subject to enzyme attack. Ordinarily, significant gelatinization of wheat starch does not occur during baking until a temperature is achieved at which fungal alpha amylase is rapidly denatured. To avoid the gumminess problems associated with the use of bacterial alpha amylase, the enzymes should retain their starch hydrolyzing activity through a major portion of the baking process and thereafter terminate. Thus, the enzyme should be active throughout a temperature zone with an upper zone boundary which may be selected and controlled.

According to the invention, a protective sugar solution or medium surrounds the fungal alpha amylase enzyme after its incorporation in a dough. Therefore, the fungal alpha amylase solutions containing high concentrations of water soluble sugars, retain their starch hydrolyzing activity, even when heated to temperatures well above those at which the enzyme would normally be completely denatured.

In the examples which follow, reference will sometimes be made to a use of protected fungal alpha amylase enzyme in conjunction with chemical emulsifiers in yeast and chemically leavened doughs.

Short time yeast raised bakery products are becoming increasingly important to the baking industry because they permit flexible production scheduling. The doughs for these products are not subjected to prolonged fermentation periods and they tend to be somewhat firmer than conventional bread having longer fermentation periods. Hence, short time breads represent a more stringent testing of softening effectiveness as compared to a comparable test using conventional bread.

However, most bread is still produced by one of the more conventional bread-making procedures, which employs longer fermentation periods. Insofar as the invention is concerned, the significance of the longer fermentation period lies in the opportunity for moisture transfer within the dough. Over a prolonged period, this moisture transfer may lead to a dilution of a concentrated sugar solution which protects the fungal alpha amylase against thermal denaturation. Such dilution could reduce the sugar concentration below the point at which protection is afforded the enzyme. Therefore, to insure that the invention will also apply to conventional bread-making processes, a straight dough bread-making procedure and a sponge and dough procedure was employed with longer fermentation periods, as well as a proof period of approximately one hour.

EXAMPLE 1

Example 1 shows the thermal stability imparted to fungal alpha amylase derived from *Aspergillus oryzae* when dispersed in solutions of sucrose. In greater detail, aqueous solutions of sucrose were prepared at concentrations of 35 to 65% by weight. Fungal alpha amylase (Miles Laboratories, Elkhart, Ind.), containing approximately 5000 SKB (Sandstedt, Kneen & Blish units) per gram of alpha amylase activity was dissolved in the sucrose solutions to obtain an activity of approximately 65 SKB/g. of solution. The sugar-enzyme solution was placed in a 170° F. water bath. Aliquots of the solution were withdrawn at intervals and observed for their ability to liquify a starch gel as an indication of residual alpha amylase enzyme activity.

The starch gel liquefaction was determined by preparing a starch gel from a 7.5% dispersion of corn starch which was cooked to completely gelatinize the starch. The gel was poured into a series of dishes and cooled to room temperature. Aliquots of sugar-enzyme syrup were removed from a 170° F. water bath and mixed into the soft starch gel. The time required for liquefaction of the starch gel to occur is measured in minutes. This time period is an indication of the residual alpha amylase activity, following heating.

TABLE 1

| Liquefaction of Starch Gels at 170° F. by Fungal Alpha Amylase Enzyme in Concentrated Sucrose Solution [1] | | | | | |
|---|---|---|---|---|---|
| % Sucrose of Solution | Minutes for Liquefaction of Starch Gel Incubation Time at 170° F. [2] | | | | |
| | 5 Min. | 7 Min. | 9 Min. | 11 Min. | 13 Min. |
| 65 | 3 | 3 | 3 | 3 | 3 |
| 55 | 2 | 2 | 3 | 4 | 4 |
| 35 | no liquefaction | | | | |

[1]Fungal alpha amylase from *Aspergillus oryzae* (Miles Laboratories, Elkhart, Ind.) at activity of 65 SKB per g. of solution.
[2]Sugar solution brought to 170° F. before timing was started.

The foregoing Table 1 shows that significant protection against destruction by heat was provided to the enzyme dissolved in concentrated sucrose solutions at a temperature of 170° F. At least 55% sugar (by weight) was required to provide the protective effect. When the solution was 35% sucrose, there was insufficient protection against thermal denaturation of the enzyme.

The finding is that sucrose solutions of at least 55% concentration provides protection against thermal denaturation of fungal alpha amylase.

EXAMPLE 2

A series of sugars including sucrose, dextrose, fructose, invert syrup and corn syrup were evaluated for the protection which they afford against thermal denaturation of fungal alpha amylase. The procedure was the same as that described in Example 1. Sugar concentrations of 40 to 60% (w/w) were tested for the protective effect upon the enzyme at temperatures of 170° F. and 180° F.

Measurable protection is afforded the enzyme exposed to the temperature of 180° F. In each instance, the highest tested level of sugar provided the greatest protection. Sucrose provides the highest order of protection to the enzyme exposed to 180° F. It would be anticipated that blends of sucrose and other sugars at a total concentration of at least 60% would provide at least 30 minutes protection against thermal denaturation of the enzyme at 170° F. and an intermediate level of protection at 180° F., depending on the relative concentrations of sucrose and other sugars used.

Having demonstrated that incorporation of fungal alpha amylase in concentrated sugar syrups significantly increases the thermal stability of this enzyme, it will be shown below how such protected enzymes incorporated in bread doughs increase the softness retention of bread following baking (See Table 2).

| PROTECTED ENZYME FORMULA | |
|---|---|
| Ingredients | % |
| Hydrolyzed Cereal Solids[2] | 2.20 |
| Water | 11.05 |
| Hydrogenated Shortening | 15.49 |
| | 100.00% |

[1]Miles Laboratories, Elkhart, Inc.
[2]"Mor-Rex" 1918 (CPC International, Edgewood Cliffs, N.J.), "Mor-Rex" is described in U.S. Pat. No. 3,849,194.

TABLE 2

Time Required for Liquefaction of Starch Gels by Heated Dispersions of Fungal Alpha Amylase in Concentrated Sugar Solutions

| Sugar | Conc. % | Minutes Heated at 170° F. | | | | | | | Minutes Heated at 180° F. | | | | | | |
|---|---|---|---|---|---|---|---|---|---|---|---|---|---|---|---|
| | | 0 | 2.5 | 5 | 10 | 15 | 20 | 25 | 30 | 0 | 2.5 | 5 | 10 | 15 | 20 | 25 | 30 |
| Control - None | 0 | N | | | | | | | | | | | | | | |
| Sucrose | 40 | 0.5 | — | 3 | N | | | | | N | | | | | | |
| | 50 | 0.5 | — | 1 | 2.5 | 3.5 | 5 | 5.5 | 9 | 4 | N | | | | | |
| | 56 | 0.75 | — | 0.75 | 0.75 | 1 | | 1.5 | — | 1.5 | | | | | | |
| | 60 | | | | | | | | | 0.5 | 0.75 | 1 | 1.5 | 2 | 2.5 | — | 6.5 |
| Dextrose | 40 | 2 | N | | | | | | | | | | | | | |
| | 50 | 0.5 | 0.5 | 0.75 | 1.5 | 3 | 4.5 | N | | | | | | | | |
| | 60 | 0.5 | — | 0.5 | 0.5 | 0.75 | 1 | 1 | 1 | 0.5 | 1.5 | 1.5 | N | | | |
| Fructose | 30 | 2 | N | | | | | | | | | | | | | |
| | 40 | 0.5 | 2.5 | 2.5 | N | | | | | | | | | | | |
| | 50 | 0.75 | 0.75 | 1 | 2 | 2 | N | | | N | | | | | | |
| | 60 | 1 | — | 1.5 | 1.5 | 2.5 | 3 | 3 | 3 | 1 | 1.5 | 4 | N | | | |
| Invert Syrup | 40 | 0.75 | 2.5 | 2.5 | N | | | | | | | | | | | |
| | 50 | 1 | — | 1.5 | 3.5 | 6 | 6 | 6 | N | 4 | N | | | | | |
| | 60 | 1 | — | — | 1.5 | — | 1.5 | — | 3 | 2.5 | N | | | | | |
| Corn Syrup | 40 | 1.5 | N | | | | | | | N | | | | | | |
| | 50 | 0.75 | — | 1 | — | 2 | 10 | N | | 11 | N | | | | | |
| | 60 | 0.5 | — | 0.75 | 0.75 | 0.75 | 1 | 1 | 1 | 0.75 | 11.5 | N | | | | |

N = No starch liquefaction was detected within 15 minutes after treated enzyme is added to starch gel.

EXAMPLE 3

A short time bread formulation was employed as a test vehicle to evaluate the combination of a chemical emulsifier and a protected fungal alpha amylase as an aid for bread softness retention. Short time doughs employ one or more chemical fermentation accelerators as a means for avoiding the long bulk fermentations that are required with conventional dough-making techniques, such as with sponge doughs and straight doughs. The following bread formulation and procedure was employed.

| "SHORT TIME" BREAD FORMULATION | |
|---|---|
| Ingredients | Parts |
| Flour | 100 |
| Water | 60 |
| Non-fat Dry Milk | 1.24 |
| Dried Whey | 1.24 |
| Sugar | 4.0 |
| Shortening (lard) | 4.0 |
| Salt | 2.0 |
| Monocalcium Phosphate | 0.27 |
| Emulsifier[1] | 0.40 |
| Active Dry Yeast | 1.45 |
| Fungal Alpha Amylase | Variable |

[1]"Atmul 500" mono and diglycerides (ICI America, Wilmington, Del.).

A protected enzyme preparation was made according to the following formulation:

| PROTECTED ENZYME FORMULA | |
|---|---|
| Ingredients | % |
| Lecithin | 46.48 |
| Fungal Alpha Amylase (5000 SKB/g.)[1] | 2.75 |
| Sucrose | 22.03 |

The fungal amylase enzyme was dissolved in a portion of the formula water. Sucrose and hydrolyzed cereal solids were dissolved in the remaining formula water and the two solutions combined. Shortening and lecithin were mixed together until homogeneous, and then the aqueous solution of sugar and enzyme was added to them, and mixed thoroughly. Protected enzyme of the above formulation was used in doughs at levels of 50 and 250 SKB per 100 g. of flour. Unprotected enzyme consisted of an addition of a similar concentration of fungal alpha amylase to the yeast plus water dispersion that was added to the dough.

Hydrolyzed cereal solids is a generic term for a mixture of low dextrose equivalent, water soluble oligosaccharides containing a preponderance of saccharides having six or more glucose units per molecule. This material was incorporated in the protecting medium because enzyme stability is frequently enhanced by the formation of an enzyme-substrate complex. Hydrolyzed cereal solids represent a soluble substrate which could form an enzyme-substrate complex with fungal alpha amylase enzyme.

The following procedure was employed in preparing the above-described bread formulation: dry ingredients, shortening and emulsifier were mixed briefly. Dispersed yeast plus water and unprotected enzyme, where applicable, were added and the dough mixed to the clean-up stage. As those skilled in the art know, a dough is described as having reached the clean-up stage when the dough pulls away from the sides of a mixing bowl.

The protected enzyme was added after the dough had been mixed a minimum of two minutes. At this time, the dough-forming water was absorbed within the dough and was not available to dissolve the sugar in the protected enzyme. Mixing was completed and the dough was fermented at 85° F. before dividing, molding and panning. Panned dough was proofed for 50 to 60 minutes to a height of ½ inch above pan height. Thereafter, it was baked at 400° F., for twenty minutes.

The bread was cooled, package in plastic film, and stored at room temperature until it was evaluated for softness at 24 and 72 hours. Each cube cut from the loaf was subjected to a two-minute compression by a standard weight (300 g.). The results are set forth in TABLE 3.

TABLE 3

Softness Retention in Bread Treated With Protected Fungal Alpha Amylase and Mono- and Diglycerides

| Test Variable | Average % Compressibility | | |
|---|---|---|---|
| | 24 Hrs. | 72 Hrs. | % Change |
| 1. Control - no enzyme or emulsifier | 29.1 | 6.0 | −79.4 |
| 2. 0.4% Emulsifier[1] + 50 SKB Protected Fungal Alpha Amylase/100 g. Flour | 41.0 | 26.6 | −35.1 |
| 3. 0.4% Emulsifier[1] + 250 SKB Protected Fungal Alpha Amylase/100 g. flour | 52.7 | 35.8 | −32.1 |
| 4. 0.4% Emulsifier[1] + 50 SKB Unprotected Fungal Alpha Amylase/100 g. flour | 43.9 | 10.9 | −75.2 |
| 5. 0.4% Emulsifier[1] + 250 SKB Unprotected Fungal Alpha Amylase/100 g. flour | 55.4 | 18.3 | −67.0 |
| 6. 0.4% Emulsifier[1] | 16.6 | 7.6 | −54.2 |

[1]"Atmul 500" mono- and diglycerides (ICI America, Wilmington, Del.).

This test shows that the protected enzyme provides greater retention of softness of 72 hours than does unprotected enzymes, in combination with mono- and diglycerides. The rate of decine in bread softness between 24 and 72 hours is significantly less for the combination of a stabilized enzyme plus emulsifier than it is for an unprotected enzyme, plus an emulsifier. Both protected and unprotected fungal alpha amylase enzyme plus mono- and diglycerides increase bread softness compared to the effect to an emulsifier alone. Higher levels of enzyme yield increased softness at 24 and 72 hours, as compared to the lower level of enzyme. After 72 hours, the combination of mono- and diglycerides plus protected fungal alpha amylase is clearly superior in softness retention to the combination with the unprotected enzyme.

The dough mixing and other procedures take into consideration the need to avoid extracting the enzyme from its protective medium or diluting the sugar solution, during preparation of the dough, subsequent dough handling, and baking. The incorporation of a concentrated sugar syrup plus an enzyme into a dough should not dilute the sugar concentration to a point that is inadequate to protect the fungal enzyme against thermal denaturation.

The addition of the enzyme-containing syrup to a dough, after preliminary mixing, prevents early dilution of the syrup since the dough water is rapidly bound by the flour proteins and thereafter is no longer free to dilute the syrup. Mixing time and speed, and similar factors, can affect the thickness of the film of syrup plus enzyme, deposited within the dough. Diffusion of water into the protected enzyme solution, dispersed in the dough, is governed by Fick's Law, which is described on page 1256 of the *Textbook of Physical Chemistry* by Glasstone (D. Van Nostrand Co. Inc., N.Y., 3d ed. 1946). Fick's law states that diffusion across a concentration gradient is directly related to concentration and time, and is inversely related to distance (film thickness).

Lecithin and shortening were also used as components of the protecting medium, described in Example 3, as means for increasing the viscosity of the medium and providing a partial barrier to easy diffusion of water into the protecting medium during mixing and baking. These ingredients may tend to prevent a release of the enzyme during baking and thereby prevent partial hydrolysis of starch gelatinized during the baking process. Therefore, it was considered desirable to employ a protecting medium having a smaller risk of irreversibly binding the enzyme in the baking dough.

EXAMPLE 4

The short time bread formulation and procedure of Example 3 were used with the exceptions that 3% lard was used as shortening and 0.4% sodium stearoyl-2-lactylate was used as emulsifier. A concentrated solution of sucrose was used to provide protection for the fungal alpha amylase against thermal denaturation. The protected enzyme was prepared according to the following formulation:

| PROTECTED ENZYME FORMULA | |
|---|---|
| Ingredients | % |
| Sucrose | 61.73 |
| Water | 30.87 |
| Hydrolyzed Cereal Solids[1] | 6.17 |
| Fungal Alpha Amylase (5000 SKB/g.)[2] | 1.23 |
| | 100.00% |

[1]"Mor-Rex 1918" (CPC International, Edgewood Cliffs, N.J.).
[2]Miles Laboratories, Elkhart, Ind.

The enzyme was dissolved in a portion of the formula water and combined with the solution of sugar and hydrolyzed cereal solids in the remainder of the water. The resulting solution was used at a level which provided 50 SKB of fungal alpha amylase activity per 100 g. of flour in the bread formula.

TABLE 4

Softness Retention in Bread Treated with Protected Fungal Alpha Amylase and Sodium Stearoyl-2-Lactylate

| Test Variable | Average % Compressibility | | |
|---|---|---|---|
| | 24 Hrs | 72 Hrs. | % Change |
| 1. Control - no enzyme or emulsifier | 28.6 | 7.2 | −74.8 |
| 2. 50 SKB/100 g. flour unprotected enzyme | 35.7 | 9.5 | −73.4 |
| 3. 50 SKB/100 g. flour protected enzyme | 29.2 | 7.5 | −74.3 |
| 4. 0.4% Emulsifier[1] | 42.5 | 14.5 | −65.9 |
| 5. 0.4% Emulsifier[1] + 50 SKB unprotected enzyme 100 g. flour | 38.9 | 15.6 | −59.9 |
| 6. 0.4% Emulsifier[1] + 50 SKB protected enzyme/ 100 g flour | 39.2 | 30.7 | −21.7 |

[1]"Emplex", sodium stearoyl-2-lactylate (C. J. Patterson Co., Kansas City, Mo.).

Example 4 demonstrates the synergistic effect on bread softness retention produced by the combination of protected fungal alpha amylase and a chemical emulsifier, in this instance, sodium stearoyl-2-lactylate. Neither a protected nor unprotected enzyme alone or an emulsifier alone exhibits as high a level of bread softness retention at 72 hours as was exhibited by the combination. Thus, there is a superior result growing out of the combination of the chemical emulsifier and the fungal alpha amylase, protected against thermal denaturation by concentrated sucrose. Clearly, the unprotected enzyme plus the emulsifier is less effective in preserving bread softness at 72 hours.

EXAMPLE 5

A commercial hydrated emulsifier composition was used that contained approximately 12.5% polysorbate 60, 37.5% mono- and diglycerides, and 50% water ("Tandem 11 H", ICI America, Wilmington, Del.). The protected enzyme of Example 4 was used at a level which provided 50 SKB fungal alpha amylase activity per 100 g. of flour. The following bread formulation and procedure were employed.

| STRAIGHT DOUGH BREAD FORMULATION | |
|---|---|
| Ingredients | Parts |
| Flour | 100 |
| Water | 59 |
| Non-fat Milk Solids | 1.25 |
| Dried Whey | 1.25 |
| Sugar | 3.0 |
| Dextrose | 3.0 |
| Salt | 2.0 |
| Lard | 3.0 |
| Active Dry Yeast | 1.45 |
| Potassium Bromate | 10 PPM (flour basis) |
| Ammonium Chloride | 0.05 |
| Emulsifier[1] | 0.75 where used |
| Fungal Alpha Amylase | 50 SKB where used for each 100 grams of flour |

[1]"Tandem 11 H" (ICI America, Wilmington, Del.).

Yeast was dispersed in water. Where used, unprotected fungal alpha amylase enzyme was added to the yeast water to provide an alpha amylase activity of 50 SKB per 100 g. of flour. Yeast, shortening, emulsifier, and water were added to the dry ingredients. The ingredients were mixed to the clean-up stage. Where used, the protected enzyme was added at the clean-up stage and mixed for six minutes. The dough was fermented at 80° F. for 2 hours; then, it was divided, scaled, molded, and panned. Doughs were proofed at 105° F., 85% relative humidity, for approximately 60 minutes or until the dough rises ½ inch above the pan height. The bread was baked at 400° F. for 20 minutes, cooled, wrapped in plastic film and stored at room temperature. The bread compressibility determinations were made after 24 and 72 hours.

TABLE 5

Softness Retention in Bread Treated with Protected Fungal Alpha Amylase and a Hydrated Emulsifier Composition

| Test Variables | Average % Compressibility | | |
|---|---|---|---|
| | 24 Hrs. | 72 Hrs. | % Change |
| 1. Control - no enzyme or emulsifier | 49.2 | 18.5 | −62.4 |
| 2. 0.75% Emulsifier[1] | 51.5 | 23.8 | −53.8 |
| 3. 0.75% Emulsifier[1] + 50 SKB Unprotected Fungal alpha amylase/100 g. flour | 52.9 | 30.9 | −41.6 |
| 4. 0.75 Emulsifier[1] + 50 SKB Protected Fungal alpha amylase/100 g. flour | 56.7 | 41.6 | −26.6 |

[1]"Tandem 11 H" (ICI America, Wilmington, Del.).

Table 5 demonstrates that the protected enzyme remains functional throughout a normal fermentation and proof period. The combination of a protected enzyme plus an emulsifier provides a significant improvement in bread softness after 72 hours, as has been demonstrated in the previous examples. The combination of an unprotected enzyme and an emulsifier was not as effective in retaining bread softness at 72 hours.

Example 2 shows that a wide variety of sugars protect fungal alpha amylase, to prevent its thermal destruction at temperatures well above those which normally cause inactivation of the unprotected enzyme. The following series of examples show that the sugars of Table 2 also protect against thermal destruction of the enzyme, when incorporated in yeast raised bread. Further, it is demonstrated below that the protected fungal alpha amylase enzymes may be used with a variety of chemical emulsifiers that are typically used in the baking industry.

EXAMPLE 6

The conventional dough bread formula and procedure of Example 5 were employed with a protected enzyme composition using corn syrup as the protective sugar medium.

| PROTECTED ENZYME FORMULA | |
|---|---|
| Ingredients | % |
| Corn Syrup | 66.4 |
| Water | 24.0 |
| Hydrolyzed Cereal Solids[1] | 8.0 |
| Fungal Alpha Amylase (5000 SKB/g.) | 1.6 |
| | 100.00% |

[1]"Mor-Rex" 1918 (Corn Products Company, Edgewood Cliffs, N.J.)

"Emplex", sodium stearoyl-2-lactylate (C. J. Patterson Co., Kansas City, Mo.) was employed as the emulsifier composition.

TABLE 6

Softness Retention in Bread Treated with Corn Syrup-Protected Fungal Alpha Amylase and Sodium Stearoyl-2-Lactylate

| Test Variables | Average % Compressibility | | |
|---|---|---|---|
| | 24 Hrs. | 72 Hrs. | % Change |
| 1. Control - no enzyme or emulsifier | 46.1 | 11.2 | −75.7 |
| 2. 0.5% Emulsifier[1] | 58.3 | 45.8 | −21.4 |
| 3. 0.5% Emulsifier[1] + 50 SKB Protected Enzyme/100 g. Flour 4 Minutes Mixing Time After Enzyme Addition to Dough | 59.7 | 50.3 | −15.7 |
| 4. 0.5% Emulsifier[1] + 50 SKB Protected Enzyme/100 g. flour 2 Minutes Mixing Time After Enzyme Addition to Dough | 63.0 | 58.0 | −7.9 |

[1]"Emplex" sodium stearoyl-2-lactylatex (C. J. Patterson Co., Kansas City, Mo.).

The results show that the softness retention is affected by the mixing time of the dough containing the protected enzyme. A reduction in the mixing time of the protected enzyme increases the softness retention of bread. Probably, this increase results from the decreasing of the diffusion of water into the protected enzyme system which results from a less finely dispersed film of protected enzyme.

EXAMPLE 7

The bread formulation and procedure of Example 5 was used with the exception that succinylated monoglycerides ("Myverol" SMG, Eastman Chemical Products) was used as the emulsifier. A protected enzyme composition was prepared with invert syrup according to the following formulation.

| PROTECTED ENZYME FORMULA | |
|---|---|
| Ingredients | % |
| Invert Syrup | 84.7 |
| Water | 13.6 |
| Fungal Amylase (5000 SKB/g.)[1] | 1.7 |
| | 100.00% |

[1]Miles Laboratories (Elkhart, Ind.)

The protected enzyme was used at a level that provided an activity of 50 SKB per 100 g. flour. The protected enzyme was added to the dough and mixing was continued thereafter for approximately two minutes.

It will be noted that the protecting sugar formulation contains only the invert syrup, water and enzyme. The previous use of hydrolyzed cereal solids was eliminated to demonstrate that the essential protection is provided by the sugar alone.

Succinylated monoglycerides, at a level of 0.25% based on flour weight, was melted into the fat component of the bread formulation. The fat and emulsifier combination was allowed to solidify and then was plasticized by mechanical mixing. The resulting combination was added to the dough-forming ingredients.

TABLE 7

Softness Retention in Bread Treated with Invert Syrup-Protected Fungal Alpha Amylase and Succinylated Monoglycerides

| Test Variables | Average % Compressibility | | |
|---|---|---|---|
| | 24 Hrs. | 72 Hrs. | % Change |
| 1. Control - no enzyme or emulsifier | 44.7 | 12.6 | −71.8 |
| 2. 0.25% Emulsifier[1] | 33.6 | 11.0 | −67.3 |
| 3. 0.25% Emulsifier[1] + 50 SKB/100 g. flour Unprotected Enzyme | 45.6 | 22.1 | −51.5 |
| 4. 0.25% Emulsifier[1] + 50 SKB/100 g. flour Protected Enzyme | 51.9 | 41.6 | −19.8 |

[1]"Myverol SMG" succinylated monoglycerides (Eastman Chemical Products, Kingsport, Tenn.)

The fungal alpha amylase is highly effective when protected against thermal denaturation by invert syrup plus succinylated monoglycerides. The bread softness retention was improved between 24 and 72 hours, as compared to the effect of an emulsifier alone or an emulsifier plus an unprotected enzyme. Example 7 provides further evidence that a combination of an effective level of protected fungal alpha amylase enzyme and chemical surfactant will provide an improvement in bread softness retention.

EXAMPLE 8

A combination of propylene glycol monoesters ("Myverol P-06," Eastman Chemical Products, Kingsport, Tenn.) and a fructose-protecting medium was used in the short time bread formulation of Example 4. The emulsifier was used at a level of 0.4% based on flour weight. The emulsifier was melted into the formula fat component before it was added to the dough-forming ingredients.

Fungal alpha amylase enzyme was protected against thermal denaturation by a fructose-protecting medium of the following composition.

| PROTECTED ENZYME FORMULA | |
|---|---|
| Ingredients | % |
| Fructose | 64.1 |
| Water | 34.6 |
| Fungal Amylase (5000 SKB/g.)[1] | 1.3 |
| | 100.00% |

[1]Miles Laboratories, Elkhart, Ind.

The protected enzyme was used at a level which provided 50 SKB per 100 g. of flour. The protected enzyme was added to the dough approximately two minutes before the end of the mixing period. Before mixing, an unprotected enzyme which was at a level of 50 SKB per 100 g. of flour was added to the dough ingredients, with the yeast-water solution.

TABLE 8

Softness Retention of Bread Treated with Fructose-Protected Fungal Alpha Amylase and Propylene Glycol Monoesters

| Test Variables | Average % Compressibility | | |
|---|---|---|---|
| | 24 Hrs. | 72 Hrs. | % Change |
| 1. Control - no enzyme or emulsifier | 52.0 | 16.5 | −68.3 |
| 2. 0.4% Emulsifier[1] | 45.2 | 31.4 | −30.5 |
| 3. 0.4% Emulsifier[1] + 50 SKB/100 g. flour Unprotected Enzyme | 44.9 | 39.2 | −12.7 |
| 4. 0.4% Emulsifier[1] + 50 SKB/100 g. flour Unprotected Enzyme | 58.6 | 53.0 | −6.2 |

[1]"Myverol P-06", propylene glycol monoesters (Eastman Chemical Products, Kingsport, Tenn.).

Both the 24-hour bread softness and the retention of softness at 72 hours were significantly increased by the combination of a fungal alpha amylase enzyme protected against thermal denaturation by a concentrated fructose solution, and propylene glycol monoesters. It is noteworthy that the combination of an emulsifier and a protected enzyme provided greater softness after 72 hours than was obtained at 24 hours with either an emulsifier alone or the emulsifier plus an unprotected enzyme.

EXAMPLE 9

A combination of calcium stearoyl-2-lactylate "Verv," C. J. Patterson, Kansas City, Mo.) and fungal alpha amylase protected by a dextrose medium was evaluated for bread softness retention, using the bread formulation of Example 4. Calcium stearoyl-2-lactylate, at a level of 0.4% based on flour weight, was mixed with the dry ingredients in the bread formulation.

A dextrose-protecting medium of the following composition was used in this example:

| PROTECTED ENZYME FORMULA | |
|---|---|
| Ingredients | % |
| Dextrose | 64.1 |
| Water | 34.6 |
| Fungal Amylase (5000 SKB/g.)[1] | 1.3 |
| | 100.00% |

[1]Miles Laboratories, Elkhart, Ind.

The protected enzyme solution was used at a level which provided 50 SKB per 100 g. of flour. The protected enzyme was added to the dough approximately two minutes before the end of the mixing period. The unprotected enzyme at 50 SKB/100 g. flour was added with the yeast-water solution.

TABLE 9

Softness Retention of Bread Treated with Dextrose-Protected Fungal Alpha Amylase and Calcium Stearoyl-2-Lactylate

| Test Variables | Average & Compressibility | | |
|---|---|---|---|
| | 24 Hrs. | 72 Hrs. | % Change |
| 1. Control - no enzyme or emulsifier | 47.2 | 16.0 | −66.1 |
| 2. 0.4% Emulsifier[1] | 52.3 | 22.7 | −56.6 |
| 3. 0.4% Emulsifier[1] + 50 SKB/100 g. flour Unprotected Enzyme | 34.1 | 10.1 | −70.4 |
| 4. 0.4% Emulsifier[1] + SKB/100 g. flour Protected Enzyme | 50.9 | 40.2 | −21.0 |

[1]"Verv", calcium stearoyl-2-lactylate (C. J. Patterson Co., Kansas City, Mo.).

The combination of protected fungal alpha amylase enzyme and calcium stearoyl-2-lactylate increased bread softness retention at 72 hours, as compared to the softness by either the emulsifier alone or the emulsifier plus an unprotected enzyme. Once again, the results demonstrate that a combination of an emulsifier and a sugar-protected enzyme significantly improves extended bread softness.

Diffusion of the sugar-protecting medium from the enzyme in the dough would lead to premature enzyme inactivation in the baking bread, before the starch was sufficiently gelatinized to be subject to enzyme hydrolysis. In the above examples, one approach to maintaining the sugar concentration in the protecting medium has been to subject the protected enzyme to minimal mixing after the dough has been essentially completely mixed. Another approach is to maintain the integrity of the protected enzyme system by increasing the viscosity of the medium in order to reduce the diffusion of water into the syrup by increasing the thickness of enzyme-containing films deposited in the dough.

EXAMPLE 10

A high viscosity corn syrup ("Globe 1643," Corn Products Company, Edgewood Cliffs, N.Y.) having a viscosity of approximately 79,000 cps at 80° F. was used in this example. Fungal alpha amylase containing approximately 40,000 SKB/g. (Novo Enzyme Corp., Mamaroneck, N.Y.) was dispersed in a minimal amount of water and mixed with the high viscosity corn syrup in order to obtain an activity of approximately 100 SKB per g. of syrup.

Distilled propylene glycol monoester (Eastman Chemical P-06) was incorporated in a sponge dough bread formula at a level of 0.4%, based on total flour weight. A fungal alpha amylase enzyme, dispersed in "Globe 1643" corn syrup, was used at a level of 100 SKB per 100 g. of flour. The protected enzyme was used both at room temperature and at refrigerated temperature (40° F.). The low temperature further increases syrup viscosity and provides greater stability toward mixing in the dough. Bread was prepared by the sponge dough procedure and bread softness was evaluated after 24 and 96 hours.

TABLE 10

Softness Retention of Bread Treated with High Viscosity Corn Syrup and Propylene Glycol Monoesters

| Test Variables | % Decrease in Bread Compressibility Between 24 and 96 Hours |
|---|---|
| 1. Control - no enzyme or emulsifier | −50.0% |
| 2. Emulsifier[1] + Unprotected Enzyme | −28.2 |
| 3. Emulsifier[1] Protected Enzyme (room temp.) Added 1 minute before end of mixing | −22.2 |
| 4. Emulsifier[1] + Protected Enzyme (40° F.) Added 2 minutes before end of mixing | −17.1 |

[1]"Myverol D-06", distilled propylene glycol monoesters, (Eastman Chemical Products, Kingsport, Tenn.).

Under intense mixing conditions, the combination of an emulsifier plus a protected enzyme provides increased retention of bread softness. Greater softness retention occurs, even after 96 hours, when the viscosity of the syrup-enzyme solution is increased. It would be anticipated that other approaches toward increasing the viscosity of the protected enzyme solutions in syrup, such as addition of natural or synthetic gums, would also improve protection during mixing.

EXAMPLE 11

A chemically leavened baking powder biscuit formulation was selected to test the softening effect of the combination comprising a sugar solution of a fungal alpha amylase and a chemical emulsifier on softness retention. The following formulation was used.

| BISCUIT FORMULATION | |
|---|---|
| Ingredients | Parts |
| Flour | 250 g. |
| Baking Powder | 12 |
| Salt | 6 |
| Lard | 55 |
| Whole Milk | 183 |
| Sodium Stearoyl-2-Lactylate | 0.75 g. where used |

Procedure: Sift flour, baking powder, salt and emulsifier (where used). Cut in lard until mixture is a coarse and crumbly consistency. Add milk and mix until dough leaves side of bowl. Turn onto floured surface. Knead briefly until dough is formed. Roll to ½" thickness; cut 2" circles and bake 10 to 12 minutes at 450° F.

The protected enzyme was prepared from the following formula.

| PROTECTED ENZYME FORMULA | |
|---|---|
| Ingredients | % |
| Corn Syrup | 75 |
| Water | 24 |
| Fungal Alpha Amylase (5000 SKB/g.)[1] | 1 |
| | 100.00% |

[1]Miles Laboratories, Elkhart, Ind.

Fungal amylase protected by a concentrated corn syrup solution was added to the dough during kneading. An unprotected enzyme was added in an aqueous solution with the milk. Where used, the enzyme was at a level of 50 SKB/100 g. flour.

TABLE 11

Softness Retention of Chemically Leavened Baking Powder Biscuits Treated with Fungal Alpha Amylase and Sodium Stearoyl-2-Lactylate

| | Interval Following Baking | | | |
|---|---|---|---|---|
| | 2 Hrs. | 14 Hrs. | 24 Hrs. | 48 Hrs. |
| 1. Control | firmest | dry, crumbly | dry, crumbly | very dry, crumbly |
| 2. Emulsifier[1] Only | soft | slightly dry, crumbly | slightly dry, slightly crumbly | very dry, crumbly |
| 3. Emulsifier[1] + Unprotected Enzyme | soft | moderately dry, crumbly | slightly dry, slightly crumbly | very dry, crumbly |
| 4. Emulsifier[1] + Protected Enzyme | soft | softest, not crumbly | softest, not crumbly | slightly soft, not crumbly |

[1] "Emplex", sodium stearoyl-2-lactylate (C. J. Patterson, Kansas City, Mo.)

The results obtained for chemically leavened biscuits clearly show that the combination of a protected fungal alpha amylase plus an emulsifier (sodium stearoyl-2-lactylate) provides extended softening protection to these chemically leavened products.

EXAMPLE 12

Example 2 above indicates that sugar provides a significant protection for fungal alpha amylase enzyme incubated at 180° F. Two protected enzyme formulations were incubated at 190° F. to determine if this protection continued at a higher temperature. The following protecting media were used:

| | A | B |
|---|---|---|
| Fungal Alpha Amylase (5000 SKB/g) | 0.2 g | 0.2 g |
| Sucrose | 10.0 g | 10.0 g |
| Water | 5.0 g | 5.0 g |
| Hydrolyzed Cereal Solids[2] (Mor-Rex 1918) | 1.0 g | — |

[1] Miles Laboratories, Elkhart, Indiana
[2] Corn Products Company, Edgewood Cliffs, New Jersey The components of Formuls A and B were dissolved in the water, and a plurality of glass test tubes, each containing one of the formula solutions, were immersed in a hot water bath at temperatures which brought the contents of the test tubes to and maintained them at a temperature of 190° F. A thermometer inserted into the tubes indicated when the temperature of the contents had risen to 190° F. At that temperature, aliquots of each tube were removed and tested for their ability to liquify a starch gel, according to the method described in Example 1. Formula A liquified a starch gel in 2.5 minutes while formula B required 6 minutes to completely liquify the starch gel. These tests represented a zero time reading at 190° F. and show that the enzyme survived under these conditions after having been brought up to 190° F. Thereafter, additional aliquots were removed and tested for their ability to liquify a starch gel. No starch liquifaction could be observed with either protected enzyme solution (Formula A or Formula B) after having been incubated at 190° F. for 5 minutes. It is concluded that the sugar-protecting medium will not provide protection against thermal inactivation to fungal alpha amylase at a temperature of 190° F. or above.

It is demonstrated above that fungal alpha amylase enzyme dissolved in a concentrated solution of mono- or disaccharides exhibited increased thermal stability. The effect of sugar concentrations up to 60% and temperatures up to 180° F. were evaluated in the foregoing specification. It was established by this evaluation that the degree of protection against thermal inactivation of the enzyme depended upon the concentration of the sugar solution and the specific sugar employed, sucrose being the most effective protecting agent.

I have now found that the stabilizing effect of concentrations of sugar which are higher than the concentration employed in the above examples results in a protection of the enzyme above temperatures of 190° F.

Sugar solutions of the desired composition and concentration were prepared and each solution contained approximately 60 SKB units (Sandstedt, Kneen & Blish units) of enzyme activity per gram of solution. The pH of the solution was controlled at 5.5 with 0.1 M acetate buffer. This level of acidity is in the optimum range for fungal alpha amylase activity. The sugar-enzyme solutions were placed in a water bath at the indicated temperature for the experiment and the solution was brought to the temperature of the bath before withdrawing a sample for evaluation. The point when the solution was brought to the temperature of the bath was considered zero time. Aliquots of the sugar-enzyme solution were withdrawn at the indicated intervals and evaluated for ability to liquify a 7.5% corn starch gel as an indication of residual alpha amylase enzyme activity. The time required for liquifaction to occur was measured. Failure to liquify the starch gel within 15 minutes was an indication that the sugar concentration did not offer sufficient protection to the enzyme to be of any practical use at the given temperature in a normal baking cycle for white pan bread.

TABLE 12

| Sugar Concentration | Temperature | Time Heated | Time to Liquifaction |
|---|---|---|---|
| 60% | 190 F. | 0 min. | 2.5 min. |
| | | 2 | 4.5 |
| | | 4 | 7.5 |
| | | 6 | 7.5 |
| | | 8 | 7.5 |
| 70% | 190 F. | 0 min. | 1.0 min. |
| | | 3 | 1.5 |
| | | 6 | 1.5 |
| | | 9 | 1.5 |
| | | 12 | 2.25 |
| 70% | 200 F. | 0 min. | 1.5 min. |
| | | 1.5 | 2.5 |
| | | 3 | 2.5 |
| | | 4.5 | 2.5 |
| | | 6 | 2 |

TABLE 13

| Sugar Concentration | Temperature | Time Heated | Time to Liquifaction |
|---|---|---|---|
| 70% | 190 F. | 0 min. | 1.5 min. |
| | | 1 | 2.5 |
| | | 3 | 2.5 |
| | | 5 | 4.5 |
| | | 7 | 4.5 |
| | | 9 | 8 |
| 70% | 200 F. | 0 min. | 3.5 min. |
| | | 1 | None in 15 min. |
| 80% | 200 F. | 0 min. | 1 min. |
| | | 1 | 1.5 |
| | | 3 | 3.5 |
| | | 5 | 4.5 |

TABLE 13-continued

| Sugar Concentration | Temperature | Time Heated | Time to Liquifaction |
|---|---|---|---|
| | | 7 | 8.5 |
| | | 9 | 11.5 |

TABLE 14

Heat Stability of Fungal Alpha Amylase Enzyme in Concentrated Dextrose Solutions.

| Sugar Concentration | Temperature | Time Heated | Time to Liquifaction |
|---|---|---|---|
| 70% | 190 F. | 0 min. | None in 15 min. |
| 80% | 190 F. | 0 min. | 1 min. |
| | | 1 | 1.5 |
| | | 3 | 1.5 |
| | | 5 | 1.5 |
| | | 7 | 2 |
| | | 9 | 2 |
| 80% | 200 F. | 0 min. | 2.5 min. |
| | | 1 | 3 |
| | | 3 | 5 |
| | | 5 | 14 |

The data provided above indicates that at a sufficiently high concentration, sugar protecting media enable the fungal alpha amylase enzyme to preserve its activity at temperatures which are still below the maximum temperatures achieved in the baking process. The increased stability at high temperature affords greater opportunity for the enzyme to partially hydrolyze gelatinized starch molecules and thereby aid in preserving the softness of bread over an extended time period.

Effect of Enzyme Activity on Preservation of Bread Softness

The above examples use a fungal alpha amylase enzyme protected against thermal inactivation by dispersing in concentrated solutions of mono- and disaccharides. A marked beneficial effect on preservation of bread softness over an extended period of time was noted in bread treated with the protected enzyme plus an edible emulsifier. This effect was observed with a level of fungal alpha amylase activity of approximately 50 SKB units per 100 g of flour. Example 3 above indicates additional softening effect was not obtained when enzyme activity was increased five fold to 250 SKB per 100 g of flour.

I have found that, surprisingly, much higher levels of fungal alpha amylase enzyme activity may be protected against thermal inactivation and that will significantly increase the level of bread softness retention over an extended period of time without causing over dextrinization of the bread crumb that in previously used bacterial alpha amylase enzyme resulted in sticky and gummy crumb. The data in Example 13 below indicates that the softening effectiveness of the enzyme is proportional to the logarithm of enzyme activity. The five fold increase in enzyme activity cited in Example 3 was therefor not a sufficient increment of increase to show a beneficial result from higher enzyme activity.

EXAMPLE 13

A straight dough bread formulation was prepared with the composition as follows:

| | |
|---|---|
| Bread flour | 100 parts |
| Sugar | 6 |
| Water | 58 |
| Non fat dry milk | 2.28 |
| Shortening | 3 |
| Salt | 1 |
| Monocalcium phosphate | 0.27 |
| Dry yeast | 1.45 |
| Emulsifiers* | 0.55 |
| Potassium bromate | 10 parts per million |

The emulsifiers included 0.2% (flour basis) of ethoxylated monoglycerides and 0.35% of distilled monoglycerides. The dough was mixed and the protected enzyme composition was added to the dough two minutes before the end of the mixing period. The dough was fermented for approximately two hours at a temperature of 85° F. It was then given a bench rest of 20 minutes before molding, panning and proofing at 100° F. for 55 minutes. Loaves were baked at 400° F. for 20.5 minutes A protected enzyme composition was prepared containing 70% total sugar and fungal alpha amylase enzyme to provide 100, 500, 1,000 and 5,000 SKB units per 100 g of flour respectively. A control sample was also prepared containing emulsifier but no enzyme.

The total composition also provides for pH and viscosity control as needed for activity of the dispersed protected enzyme.

While sucrose is a sugar of choice, a 70% solution of sucrose is stable for only a short period of time and tends to crystalize readily. Combinations of sucrose and fructose do not crystalize easily and such combinations are stable over long periods. Commercial fructose syrups consisting of fructose and dextrose are satisfactory sources of fructose.

Protected Enzyme Composition

Sucrose } 70% total sugar
55% high fructose syrup }
Buffer to maintain pH in range of 5.5–7.0
Fungal alpha amylase enzyme to provide 100, 500, 1000 and 5000 SKB/100 g flour.
Algin derivative (Kelcosol) 1% of water in formula
Water as required to achieve above concentration.

TABLE 15

Softness Retention in Bread Treated With Protected Fungal Alpha Amylase Enzyme and Ethoxylated plus Distilled Monoglycerides.

| | Average % Compressibility | | |
|---|---|---|---|
| Test Variables | 1 day | 3 days | % Change |
| 1. Control - Emulsifier only | 40.2 | 8.6 | −78.6 |
| 2. Emulsifier plus 100 SKB Protected Enzyme/100 g flour | 51.7 | 23.6 | −54.4 |
| 3. Emulsifier plus 500 SKB Protected Enzyme/100 g flour | 57.5 | 35.6 | −40.2 |
| 4. Emulsifier plus 1000 SKB Protected Enzyme/100 g flour | 54.7 | 37.0 | −32.6 |
| 5. Emulsifier plus 5000 SKB Protected Enzyme/100 g flour | 57.1 | 51.3 | −10.2 |

All of the breads treated with the combination of emulsifier plus protected enzyme evidenced improved retention of softness between one and three days compared to the control containing emulsifier alone. The retention of bread softness at three days improved proportionately to the enzyme concentration. This proportionality is shown to be a function of the logarithm of the protected enzyme activity (FIG. 1). This is a surprising result which increases the effective range of the enzyme activity to at least the 5000 SKB per 100 g flour as demonstrated in the above example.

All of the breads made in example 13 were of very good quality and none exhibited a pasty or gummy crumb even at the highest level of enzyme employed.

Use of Lecithin as a Natural Emulsifier

There is widespread understanding within the baking industry as well as within other segments of the food industry concerning the sensitivity of the public to the presence of food chemicals in many foods although their use is permitted under Federal regulations. The aversion to chemical food additives is an emotional issue which is difficult for food manufacturers to deal with. As a result, a trend has developed towards the use of "natural" ingredients in the marketing of "natural" foods. Such products do not utilize chemical food additives. The baking industry markets a large array of so-called variety breads that have gained consumer acceptance through their use of whole grains and the elimination of some or all of the chemical food additives which have come to be used commonly in this country. Such additives might include chemical emulsifiers that improve dough strength, manufacturing tolerance and bread volume as well as extend freshness; salts of propionic acid that inhibit mold growth and prevent bread spoilage; and chemical oxidants (such as potassium bromate) which strengthen the gluten in flour and enables breads with high volumes and desirable texture to be made. The manufacturer of "natural" breads is likely to use vinegar as a mold inhibitor, enzyme active soy flour as a dough improver and lecithin as an emulsifying agent.

Lecithin is a generic term for the phosphorous-containing lipids derived as a byproduct from the processing of soybean oil. Commercial lecithin is a mixture of sogbean oil and various phosphatides, including phosphatidyl choline and phosphatidyl ethanolamine. Lecithin has long been known to the baking industry and has been used as an aid to dough sheeting, as a fat dispersing agent and as a tenderizing agent. Lecithin is an ingredient that is well recognized by the public as being derived from natural sources and by the baker as having a degree of minimal functionality where the use of synthetic chemical food additives is precluded.

There continues to be a need for naturally derived ingredients that can further extend the shelf life of bakery products that fit into the "natural" category, free from synthetic food additives.

While an official definition of "natural" foods or food ingredients does not now exist, it is nevertheless true that fungal alpha amylase enzyme is a natural product of the fermentation of a specific organism or group of organisms. The consumer has been exposed to both direct and indirect use of enzymes as food components and appears to accept enzymes readily as natural ingredients.

I have found that the combination of fungal alpha amylase protected against thermal inactivation by being dispersed in a concentrated solution of sugar where used in combination with lecithin will significantly improve the bread softening effectiveness of lecithin. This combination of natural ingredients will provide the interested baker with improved means for extending the shelf life of his product.

EXAMPLE 14

The straight dough formulation of Example 13 was prepared with lecithin as the only emulsifying agent at a level of 0.5% based on flour. Protected enzyme preparations were made to provide approximately 290 and 730 SKB units per 100 g of flour. A control sample containing lecithin alone was prepared as well as a control containing both lecithin and unprotected fungal alpha amylase at a level of 730 SKB units per 100 g of flour.

TABLE 16

| Test Variables | Average % Compressibility | |
|---|---|---|
| | 1 day | 3 days |
| 1. Control - 0.5% lecithin | 37.1 | 10.3 |
| 2. 0.5% lecithin plus 290 SKB protected enzyme/100 g flour | 43.9 | 22.5 |
| 3. 0.5% lecithin plus 730 SKB protected enzyme/100 g flour | 42.8 | 24.5 |
| 4. 0.5% lecithin plus 730 SKB protected enzyme/100 g flour | 26.9 | 10.7 |

Table 16 shows that after three days both of the variables containing protected enzyme retained over two times the compressibility as the emulsifier alone or lecithin plus unprotected enzyme, thus demonstrating that the bread softening effectiveness of the natural emulsifier lecithin can be increased markedly.

Those who are skilled in the art will readily perceive how to modify the system. Therefore, the appended claims are to be construed to cover all equivalent structures which fall within the true scope and spirit of the invention.

I claim:

1. A process of making a bakery product having improved softness retention over an extended shelf life period resulting from an incorporation of a combination of a fungal alpha amylase preparation which is resistent to temperatures incurred during baking and an edible emulsifier, said process comprising the steps of:
   a. mixing a dough containing an edible emulsifier taken from the group consisting of mono- or diglycerides, diacetyl tartaric acid esters of mono- and diglycerides, propylene glycol esters of mono- and diglycerides, ethoxylated monoglycerides, succinylated monoglycerides, polysorbate 60, calcium stearoyl-2-lactylate, sodium stearoyl-2-lactylate, lactylic esters of fatty acids, lecithin and mixtures of two or more of the above;
   b. preparing a fungal alpha amylase enzyme stabilized against thermal denaturation by dispersion in a concentrated aqueous solution of essentially mono- and disaccharides taken from the group consisting of dextrose, fructose, sucrose, invert syrup, corn syrups, high fructose corn syrup and mixtures of two or more of the above; said mono- and disaccharides being present in a concentration of between 50% and 80% based on the weight of the solution; said solution containing fungal alpha amylase enzyme in intimate solution with the mono- and disaccharides to provide between 10 and 5000 SKB units of fungal alpha amylase activity per 100 g. of flour in a bakery formulation, said dispersion enabling fungal alpha amylase enzyme activity to be retained in the temperature range of 170°–180° F. (76°–82° C.); and
   c. adding said sugar dispersion of fungal alpha amylase to said formed dough in such manner that the protective enzyme solution remains substantially undiluted during subsequent dough mixing, handling and baking whereby said mono- and disaccharides form a protective medium which continues to protect the enzyme after its incorporation in the dough.

2. The process of making yeast-raised bakery products according to claim 1.

3. The process of making chemically leavened bakery products according to claim 1.

4. A bakery product made by the process of claim 1 comprising a mixture of ingredients including at least one cereal component for forming baked products when said ingredients are exposed to an elevated oven temperature sufficient to bring about the initiation of gelatinization of starch contained in the cereal component, said system comprising means including a fungal alpha amylase enzyme incorporated in a dough to maintain softness of the baked product, said enzyme normally becoming substantially totally inactive within the temperature range of 167°–176° F., and means for extending the enzyme activity into the temperature range of 170°–180° F. while insuring the termination of substantially all enzyme activity at a temperature which does not exceed the internal temperature of the baked food product which is reached during baking, said means for extending enzyme activity including a dispersion of said fungal alpha amylase enzyme in a concentrated aqueous solution of essentially mono- and disaccharides taken from the group consisting of dextrose, fructose, surcose, invert syrup, corn syrups, high fructose corn syrup and mixtures of two or more of the above, said mono- and disaccharides being present in a concentration of between 50% and 80% based on the weight of the solution, said solution containing fungal alpha amylase enzyme is intimate solution with the mono- and disaccharides to provide between 10 and 5000 SKB units of fungal alpha amylase activity per 100 g. of flour in a baking solution.

5. An additive for starch-containing bakery products which are processed to achieve a minimum internal temperature of 160° F., said additive comprising a fungal alpha amylase enzyme which normally is substantially completely inactivated in a temperature range of 167°–176° F. and protective means mixed with said enzyme in proportions which extend the activity of said enzyme into the temperature range of 170°–180° F. and which terminates the activity of said enzyme at a temperature which does not exceed the internal temperature of the baked food product reached during baking, said protective means comprising a concentrated solution containing 50% to 80% of a sugar taken from the group consisting of dextrose, fructose, sucrose, invert syrup, corn syrups, high fructose corn syrup and mixtures of two or more of the above; said concentrated solution containing fungal alpha amylase enzyme in the range of 10 to 5000 SKB units of activity per 100 g. of cereal or cereal flour component of said food, and an edible emulsifier taken from the group consisting of mono- or diglycerides, diacetyl tartaric acid esters of mono- and diglycerides, propylene glycol esters of mono- and diglycerides, ethoxylated monoglycerides, succinylated monoglycerides, polysorbate 60, calcium stearoyl-2-lactylate, sodium stearoyl-2-lactylate, lactylic esters of fatty acids, lecithin and mixtures of two or more of the above.

* * * * *

UNITED STATES PATENT AND TRADEMARK OFFICE
CERTIFICATE OF CORRECTION

PATENT NO. : 4,416,903

DATED : November 22, 1983

INVENTOR(S) : MORTON S. COLE

It is certified that error appears in the above—identified patent and that said Letters Patent is hereby corrected as shown below:

Col. 1, Line 60, change "break" to --bread--.

Col. 2, Line 44, change "two" to --too--.

Col. 5, Line 8, change "82.2 C." to --93.3 C;

Col. 5, Line 52, change "breakmaking" to --breadmaking--.

Col. 7, Line 15, change "like" to --life--.

Col. 11, Line 6, change "package" to --packaged--;

Col. 11, Line 36, change "declne" to --decline--.

Col. 16, Line 47, insert --(-- before "C.J.".

Col. 19, Line 45, change "Formuls" to --Formulas--;

Col. 20, Line 36, insert the following title below "Table 12"

--HEAT STABILITY OF FUNGAL ALPHA AMYLASE ENZYME IN CONCENTRATED SUCROSE SOLUTIONS--;

UNITED STATES PATENT AND TRADEMARK OFFICE
CERTIFICATE OF CORRECTION

PATENT NO. : 4,416,903

DATED : November 22, 1983

INVENTOR(S) : MORTON S. COLE

It is certified that error appears in the above—identified patent and that said Letters Patent is hereby corrected as shown below:

Col. 20, Line 55, insert the following title below "Table 13"

--HEAT STABILITY OF FUNGAL ALPHA AMYLASE ENZYME IN CONCENTRATED FRUCTOSE SOLUTIONS--.

Col. 23, Line 39, "sogbean" should be --soybean--.

Col. 24, Line 21, change "protected" to --unprotected--.

Signed and Sealed this

Twenty-fourth Day of July 1984

[SEAL]

Attest:

GERALD J. MOSSINGHOFF

Attesting Officer

Commissioner of Patents and Trademarks

UNITED STATES PATENT AND TRADEMARK OFFICE
CERTIFICATE OF CORRECTION

PATENT NO. : 4,416,903
DATED : NOVEMBER 22, 1983
INVENTOR(S) : MORTON S. COLE

It is certified that error appears in the above—identified patent and that said Letters Patent is hereby corrected as shown below:

Col. 26, Line 5, "solution" should be --formulation--.
  (Claim 4)

Signed and Sealed this

First Day of January 1985

[SEAL]

Attest:

GERALD J. MOSSINGHOFF

Attesting Officer

Commissioner of Patents and Trademarks